United States Patent [19]
Dits

[11] 4,144,904
[45] Mar. 20, 1979

[54] CONTROL DEVICE FOR THE SPEED CONTROL OF PNEUMATIC AND/OR HYDRAULIC WORKING PISTONS

[76] Inventor: Herbert R. Dits, Adlerring 23, D-6612 Schmelz, Fed. Rep. of Germany

[21] Appl. No.: 803,348

[22] Filed: Jun. 3, 1977

[30] Foreign Application Priority Data

Jun. 3, 1976 [DE] Fed. Rep. of Germany ....... 2625063

[51] Int. Cl.[2] ............................ F16K 1/52; F16K 1/54

[52] U.S. Cl. ............................ 137/625.3; 137/625.38; 251/57; 251/206; 60/581

[58] Field of Search ................. 60/533, 537, 544, 555, 60/581; 91/35, 246, 405, 433, 469; 92/8; 251/57, 206; 137/599, 601, 625.3, 625.38

[56] References Cited

U.S. PATENT DOCUMENTS

| | | | |
|---|---|---|---|
| 2,127,877 | 8/1938 | Maglott | 60/537 X |
| 2,157,707 | 5/1939 | Keel | 91/469 X |
| 2,194,078 | 3/1940 | Simonds | 91/405 X |
| 2,852,965 | 9/1958 | Wallace | 60/533 X |
| 3,588,076 | 6/1971 | Ammerman | 267/127 |

*Primary Examiner*—Edgar W. Geoghegan
*Attorney, Agent, or Firm*—Cushman, Darby & Cushman

[57] ABSTRACT

A control device for controlling the speed of power pistons and machine elements driven by the pistons with a signal transmitter coupled to the elements, a pressure transducer producing an output from the transmitted signal having an incrementally variable transmission ratio and a throttle device with a plurality of differently shaped orifices controlled by the transducer output.

10 Claims, 11 Drawing Figures

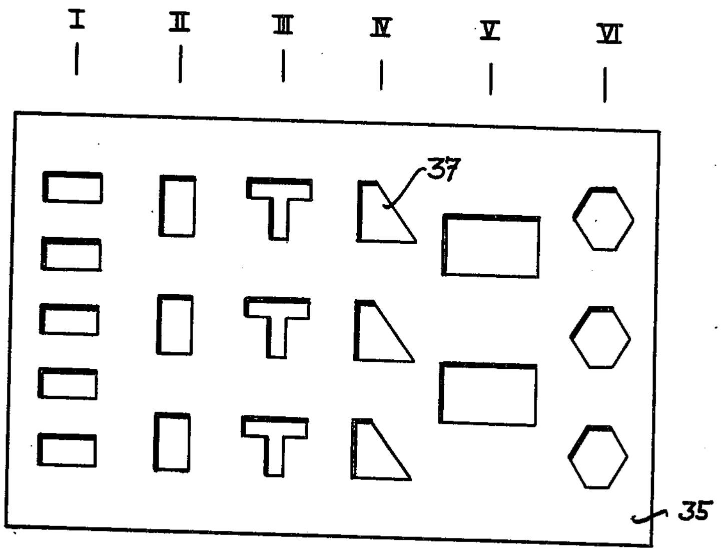
Fig. 9
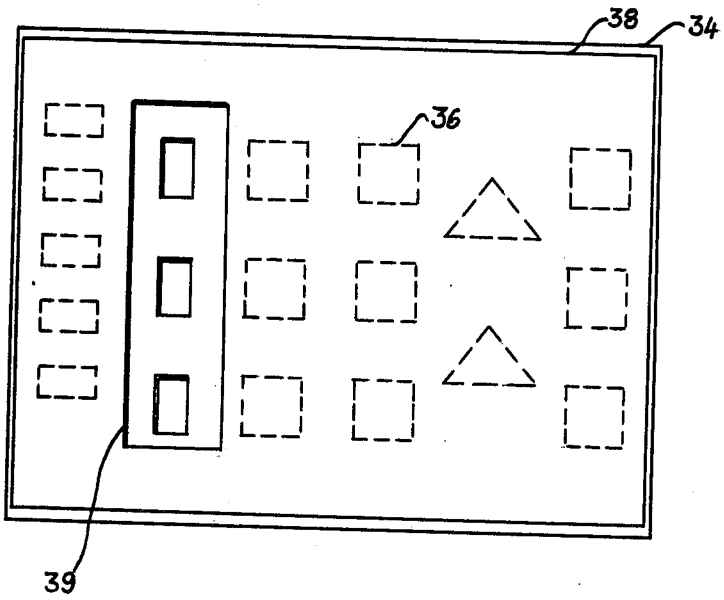
Fig. 10
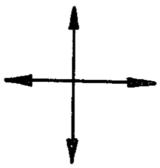

CONTROL DEVICE FOR THE SPEED CONTROL OF PNEUMATIC AND/OR HYDRAULIC WORKING PISTONS

The present invention relates to a control device for the speed control of pneumatic and/or hydraulic power pistons and machine elements driven by such power pistons, wherein the control of the power piston speed is effected across at least part of the path of movement of a machine element by the pressure head existing in a liquid flowing in parallel with the movement of operation or stroke of the element, the pressure head being produced by throttling orifices or apertures adapted to be set to a constant size or adapted to be varied in accordance with the position of the power piston.

BACKGROUND AND SUMMARY OF THE INVENTION

The speed control of hydropneumatic pistons and of their piston rods including the tools and machine parts connected thereto is conventionally effected by throttling or restricting the flow of the stream of the medium simultaneously put into motion. In the same manner, the rate of speed of hydraulic pistons may be regulated. In either case, the throttling orifice (e.g. of the pipe restriction or of the flow control valve, etc.) is set so as to correspond to the requirements, and this setting is maintained during the working process.

Also, attempts have been made to vary the throttling action on the control or working oil by mechanical means during operation in such a manner that a control element moves with the working movement, which element acts to switch on or off throttling positions in response to the distance travelled. These devices fail in the case of higher speeds of operation or of extremely small switching distances. This is due to the inertia of the mechanical transmitting means.

In particular, a single circuit of the control oil only is provided in the conventional throttling arrangement. In view of the fact that the throttling action or the throttling orifice, respectively, is structurally preset as a function of the path or distance of work (stroke) this action or orifice cannot be varied, at least not easily.

If there are involved, for example, sequences of motion in the combined punching and bending process or in the cold forming of sheet metal plates of automobile bodies, or deep drawing operations, the necessary variation of speed of the tool is theoretically required to be effected within fractions of a second and in an exactly defined position of the path of work or stroke. Such problem could heretofore not be solved satisfactorily, particularly in the case of small strokes.

One object of the present invention resides in the provision of a control device and associated means therefore, by which the drawbacks of the prior art are avoided. Specifically this device is contemplated to provide for improved variability of the control operation and for more general versatility of such control. The operating speed of a power piston should be adaptable to the specific distance-dependent requirements of the operating process within a short period of time and universally in specific positions of the path of work or stroke of a tool or a movable machine element during the working process. This is accomplished by correspondingly throttling the power medium (liquid or even gas) or a control liquid in response to the operating speed and this device should allow to influence or control, respectively, the operating speed in a technically and economically ready manner.

Accordingly, in a control device of the type as outlined at the beginning, the invention is characterized quite generally in that the first liquid flow taken along in parallel with the power pistons and/or said machine elements connected to said power pistons is utilized as a signal carrier or transmitter for varying the (degree of opening of said) throttling orifice. A liquid volume and pressure transducer having an incrementally variable transmission ratio is interposed between said throttling means and said signal transmitter. The throttling means is equipped with a plurality of differently shaped orifice cross-sections adapted to be selectively placed into action, to control the pressure head of a second oil circuit, said pressure head being adapted to be converted into mechanical power through a piston securely connected to the power piston rod or through the power piston per se.

According to the invention, two control oil circuits are provided, with one of said oil circuits acting as a signal transmitter, while the throttling pressure head is built up within the second oil circuit.

This arrangement allows incorporation into the signal transmitting circuit of a liquid volume transducer, the transmission ratio of which is adapted to be varied in accordance with the present invention, whereby the oil volume displaced by the movement of the machine element within a pick-up or transmitter cylinder may be increased or decreased as required and thereby conformed to the necessary quantity of control oil of the throttling device.

In this construction the complete throttling means can be mechanically connected to the movable (driven) machine element via a double-acting hydraulic piston by means either of a frictional link or also by abutments limiting a determined clearance or distance between two abutments, which hydraulic piston acts as a distance-dependent transmitter or drive means for the throttling means.

The liquid volume and pressure transducer interposed between a driving hydraulic circuit and another hydraulic circuit driven or actuated by the former circuit, has a volume and pressure transmission ratio adapted to be varied over at least a part of the stroke of said transducer, and this transducer serves to match a primary hydraulic circuit designed to conform to the structural conditions and the mode of operation of the transmitter, to a secondary hydraulic circuit by which the working process-depending control device as such is driven.

Since the primary hydraulic circuit generally forms the driving side within the entire throttling means, and the secondary hydraulic circuit forms the driven side of a power transmission system, the liquid volume and pressure force transducer according to the invention is applicable also to other analogous (equivalent) machine elements. It is in this way possible to match in optimum manner e.g. the hydraulic stroke of a specific driving system to not specifically correlated conditions of stroke and operation of a given driven hydraulic system, with such matching being made in an economically and operationally easiest way.

In the case of specific design dimensions of the effective piston areas both of the power cylinder associated with the movable machine element of the throttling means, and of the driven hydraulic system, the oil volume transducer according to the invention enables the path of stroke of the slide valve, if necessary, to be selected smaller or greater than the path of work of the movable machine element or that consistently the same stroke of the slide valve results in the case of paths of work of different lengths.

For changing e.g. a positive transmission ratio to a negative one, the transducer may be installed into a power transmission system simply in inverse fashion. An incrementally variable liquid volume and pressure transducer may comprise a hydraulic piston including a piston rod extending to the exterior from the interior of an oil-charged hydraulic chamber, which piston rod through a mechanical linkage is connected to the one end of at least one further piston rod having the opposite end thereof positioned as a plunger piston, within a chamber filled with hydraulic liquid and connected to the hydraulic circuit to be actuated.

In particular, an improved facility of incremental variation is provided if at least two hydraulic liquid-filled chambers with associated plunger pistons are provided and connected to the hydraulic circuit to be operated or driven, respectively.

In a closed-loop hydraulic driving or power circuit, the hydraulic piston at the driving side may be formed as a double-acting piston positioned in the hydraulic chambers, with the two (opposite) piston faces being placed into the hydraulic driving circuit. The same applies to the secondary side, by providing on the piston rod interiorly of the respective chamber a double-acting piston with the two (opposite) piston faces being interposed into the operated hydraulic circuit.

A particularly reliable and versatile incrementally operating embodiment is characterized in that said liquid volume and pressure transducer includes within said driving or operating hydraulic circuit a pair of pistons each positioned in an oil-charged hydraulic chamber and each having a piston rod extending out from said hydraulic chamber. The piston rods are mounted to a transmission means in axially opposing fashion, and a plurality of hydraulic piston-cylinder units are arranged preferably symmetrically around the axial longitudinal axis of said piston rods. The units are interposed into the driven hydraulic circuit in parallel with each other with each unit having a piston surface area different from that of said pistons in said driving hydraulic circuit and each operating in double-acting fashion within their respective cylinders with both sides of said pistons each being interconnected by a by-pass line having disposed therein a valve for selectively cancelling the effect of the individual piston-cylinder units within the driven hydraulic circuit.

In every embodiment of the liquid volume and pressure force transducer according to the invention, the individual pistons connected to the hydraulic circuit to be driven or operated may each have a surface area several times smaller than the area of each individual hydraulic piston at the driving side (or vice versa), while the total surface area of the various pistons may be approximately equivalent to the total piston surface area of the hydraulic pistons at the driving side.

The throttling device according to the invention includes paired, mutually associated throttling orifices which are formed in a stationary throttling plate, preferably of circular sleeve-like configuration and including throttling orifices, and in a throttling plate intimately contacting the former plate and being movable relative to the latter and provided with throttling orifices. The free cross-section of said mutually associated throttling orifices defined in response to the relative movement between the throttling plates is predetermined in preprogrammed fashion for the sequence of operation of the pneumatic and/or hydraulic power piston, wherein the throttling plates are preferably movable by means of a hydraulic cylinder piston incorporated into the hydraulic circuit to be operated, and in response of the motional position of the driven machine element.

In this construction, the sleeve-shaped throttling plate may be movable axially with respect to the stationary throttling plate or by rotation relative to the latter plate; alternatively, a combination of both types of adjustment may be used.

The particular advantage of a plurality of given throttling programs in a single throttling arrangement may be obtained when the peripheral surfaces of the throttling plates are provided with a plurality of programs of throttling orifices associated with each other in their direction of movement, and when the throttling plates have associated therewith a program plate which allows selection of only one of the mutually associated programs of the throttling plates each, while the other programs provided are blocked.

This throttling device allows control of the sequence of operation of the machine element (for instance, of a press or a cutting or stamping apparatus) both in dependence on time, in which case e.g. an electric stepping motor may be used in the place of the hydraulic or mechanical throttle adjusting drive means, and, preferably, mainly in dependence on the distance of travel of the machine element. As a rule, the control in dependence on distance of travel is clearly superior at high speeds of operation and small paths or stroke of work.

Below, the present invention is explained in a plurality of embodiments by referring to the enclosed drawings, wherein:

FIGS. 9 and 10 are developed views of a pair of associated, throttling plates provided in a throttling arrangement and each including a plurality of programs (I to VI)

Figure 1:
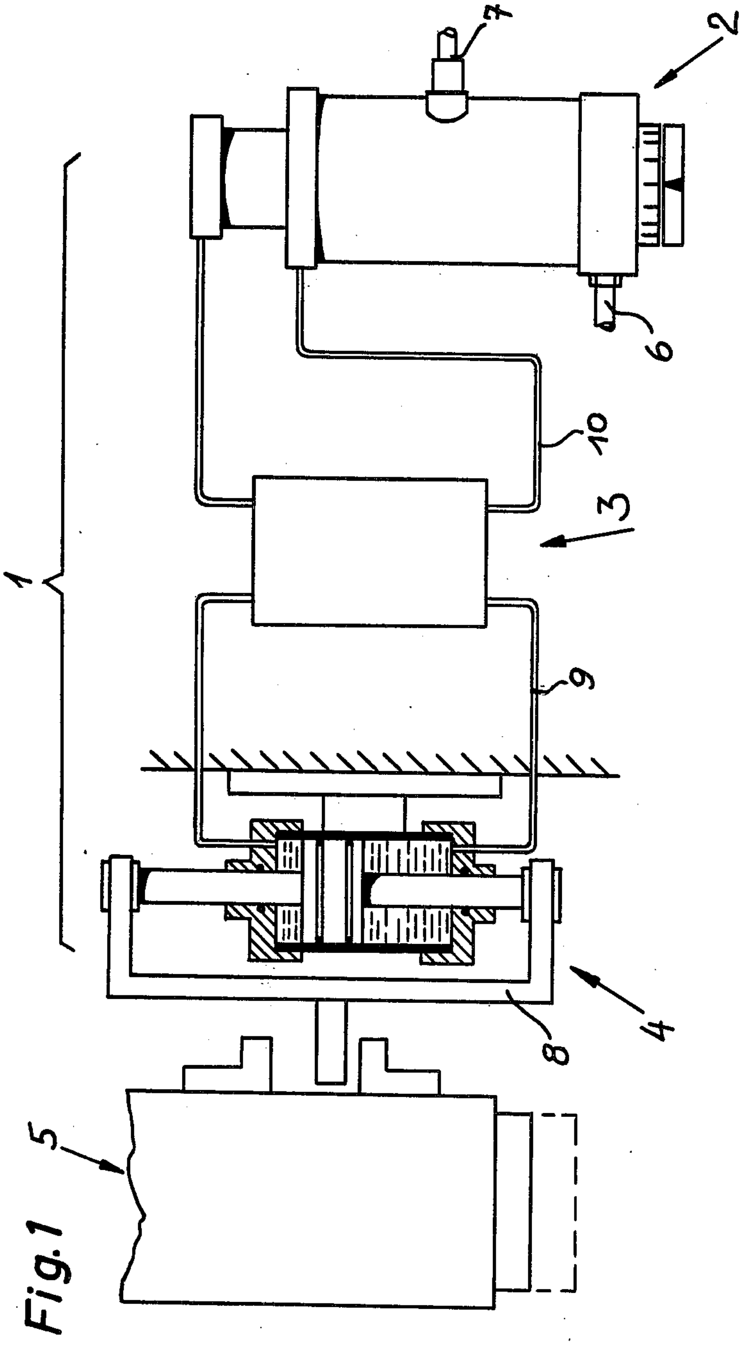
FIG. 1 is a schematical, partially sectional view of the control device according to the present invention.

On the whole, the throttling means according to FIG. 1 is comprised of a hydraulic piston device serving as the driving or power cylinder 4 of the system, a liquid volume and pressure transducer 3 and a throttling arrangement 2, with the latter having its input 6 and its output 7 connected into a not illustrated hydraulic system for operating a machine element, for instance, of a press, a cutting apparatus or even a bucket grab of an excavator, a roboter portion, etc. In this case, the throttling arrangement my be incorporated either into the power driving or output side as such of the hydraulic system, or — e.g. in the case of hydro-pneumatic operation — into the oppositely directed side of such hydraulic system or of the power piston thereof.

The power cylinder 4 scans with a yoke 8 the motional position of the machine element 5 the motion of which is to be controlled in accordance with a program (e.g. the power ram of a press), such scanning being effected either with full frictional engagement or — as shown — with operative clearance, whereby the power cylinder transduces such movement into the liquid flow of a hydraulic circuit 9 driving the control device. The throttling arrangement 2 proper is then operated by the liquid volume and pressure transducer 3 through a second, driven hydraulic circuit 10.

Irrespective of the installation into the above described throttling means, the liquid volume and pressure transducer 3, thus, acts as a matching element between a driving (operating) and a driven (operated) hydraulic circuit 9 and 10, respectively. If installed in reverse position, the liquid volume and pressure transducer 3 may operate also as a reducer providing corresponding negative transmission or reduction ratio.

Figure 2:
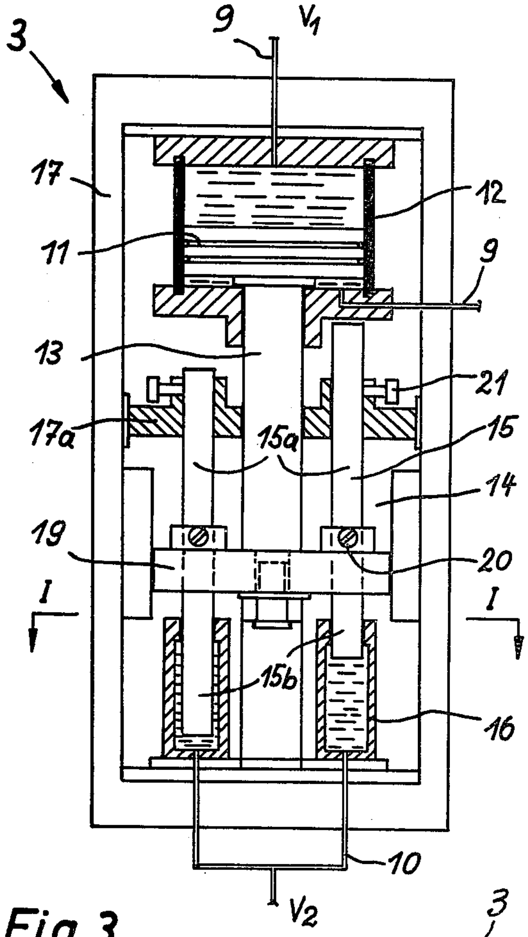
FIG. 2 shows an embodiment of the liquid volume-pressure transducer for use in the present control device.
Figure 3:
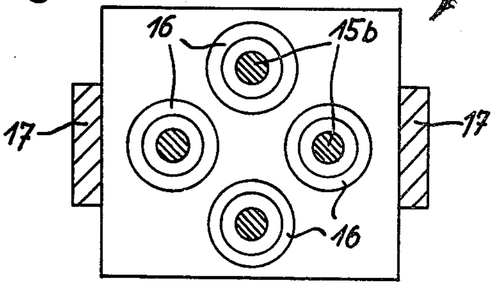
FIG. 3 is a sectional view approximately along lines I—I of FIG. 2.

In the embodiment shown FIGS. 2 and 3, the liquid volume and pressure transducer 3 comprises a hydraulic piston slidably positioned within a hydraulic chamber 12 and having a piston rod 13 which is fitted with a transverse plate 19 slidably guided in a frame 17. The transverse plate 19 encloses the upper ends 15*a* of a plurality of other piston rods 15 likewise guided within the frame 17 and having their opposite ends each extending as plunger pistons 15*b* into chambers 16 filled with hydraulic liquid, which chambers are connected to the hydraulic circuit 10 to be driven or operated. By tightening or loosing a number of fixing or set screws 20 and 21, one or more of the actually freely slidable piston rods 15 may be securely connected either to the power transmitting transverse plate 19 or to the stationary frame portion 17*a*, whereby it is achieved that the force of the driving piston rod 13 is transmitted to one or more of said piston rods 15. Preferably, the separate chambers 16 and the plunger pistons 15*b* are smaller (in area) than hydraulic chamber 12 and piston 11, respectively.

Figure 4:
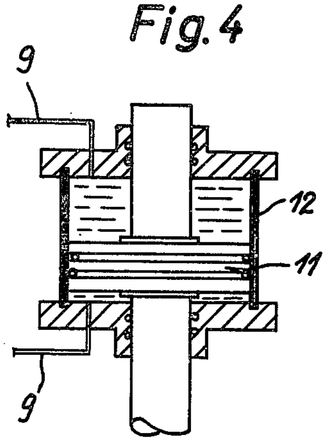
FIG. 4 is a longitudinal sectional view of a modified portion of the control device according to FIG. 2.

In the construction according to FIG. 4, the hydraulic piston 11 is disposed as a double-acting piston in a closed-loop circuit with the power cylinder 4.

Figure 5:
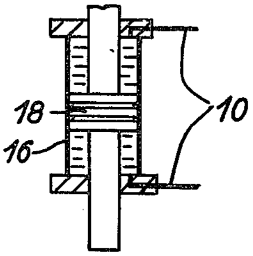
FIG. 5 is a longitudinal sectional view of another modified portion of the control device according to FIG. 2.

Accordingly, as shown in FIG. 5 the plunger pistons are placed into chambers 16 as double-acting pistons 18 in a closed-loop hydraulic circuit. Remotely controlled electromechanical locking means may be used instead of the fixing or set screws 21.

Figure 6:
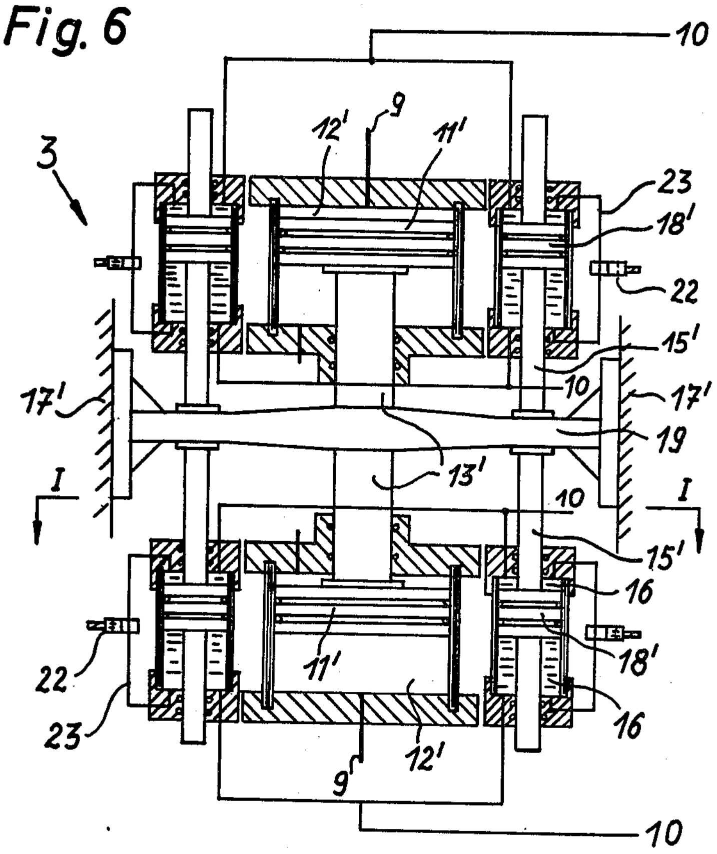
FIG. 6 shows a further embodiment of a liquid volume-pressure transducer for use in the control device according to the invention.
Figure 7:
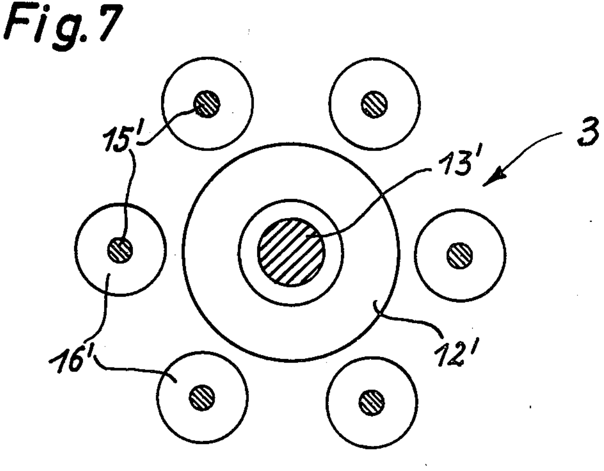
FIG. 7 is a cross-sectional view along line II—II of FIG. 6.

Different from the above described embodiment in which the mechanical power transmission may be stopped by mechanical unlocking, according to FIG. 6 there are provided bridging or by-pass lines 23 provided with on-off valves 22, which lines interconnect the cylinder spaces 16 above and below the pistons of smaller diameter, such that the repective cylinders may be selectively placed out of operation and into operation in their hydraulic circuit 10. Apart herefron, the liquid volume and pressure transducer 3 according to FIGS. 6 and 7 is of a construction equivalent to that of FIGS. 2 to 5, namely with a hydraulic piston 11′ at the primary side, hydraulic chambers 12′ and piston rods 13′ securely connected to a transverse plate 19′ which inturn is guided within frame 17′ against eccentric loads. The piston rods 15′ of the (driven) hydraulic circuit 10 to be operated are securely attached to the transverse plate 19′, while pistons 18′ are of double-acting type. Pistons 11′ of FIG. 6 is connected to an open hydraulic circuit, while pistons 18′ are connected to a closed-loop hydraulic circuit.

Liquid volume and pressure transducer 3 provides a transmission ratio Ü of $$\ddot{U} = V_1/V_2$$

with $V_1$ and $V_2$ representing the quantity of oil supplied and discharged, respectively. For the possible reversed direction, the reciprocal value (1)/Ü applies correspondingly. The diameters of the four (FIG. 3) or six pistons 18, 18′, (FIG.7) may be different from each other, too, Thus, the transmission ratio has the adjustable values of 1Ü, 2Ü, 3Ü . . . or, for the opposite direction of operation, of 1/1Ü, 1/2Ü . . .

For example, the following variants of the above described liquid (or oil) volume and pressure transducer 3 could be reflected upon:

(1) Use:

(1.1)Step-up or reduction of the pressure (1.2) Incremental control of the ratio of the primary or secondary volumes of the power medium (volume conversion)
both items constant in accordance with the equation $$E = P_1V_1 = P_2V_2$$

(1.3) As a pump providing various transmission ratios (1.4) As an element for hydraulic control systems.

(2) Media employed:

(2.1) Gas — liquid (2.2) Liquid — liquid (3) Principle of operation:

(3.1) The primary energy $E_1 = P_1V_1$ (compressed aire, hydraulic energy) is mechanically converted into mechanical energy by one or more pistons, and subsequently distributed to one or more piston faces operating in parallel with each other, and thereby converted into hydraulic energy.

(3.2) This conversion may be effected also in the opposite sense.

(4) Distribution of the energy to one or more pistons:

(4.1) By stopping the mechanical power transmission (FIG. 2)

(4.2) By returning the displaced medium in a secondary cylinder from the front face to the rear face ofa piston (equality of surface areas) (FIG. 6)

(5) Global arrangement:

(5.1) Primary and secondary cylinders arranged in tandem (5.2) Primary and secondary cylinders arranged in juxtaposition.

(6) Control of graduation:

(6.1) Manually, prior to starting operation (6.2) Electromagnetic uncoupling or electro-hydraulic idle position setting by separate secondary pistons or secondary cylinders also during operation.

According to the invention, the control of the speed of operation, e.g. of a pneumatic-hydraulic or a purely hydraulic piston-type drive means is accomplished in the course of the operating process by varying a throttling orifice placed into the path of the working or control oil. The start and the end, but also the gradient of variation are distance-dependent and are effected by the measures that at least two apertures producing the throttling effect are displaced relative to each other in a rectilinear path; that the distance of displacement is proportional to the movement of the machine element to be controlled (e.g. press tool), with the factor of proportionality being selected; and that, because of the configuration of the apertures, the throttling effect of such apertures is increased or reduced during the relative movement of such apertures, and the gradient of such variation is adapted to be determined by the configuration of the apertures. Also, with a corresponding configuration of these apertures it may be ensured that the operating speed, with a given cross-section of the apertures, is constantly held at the same magnitude over the full path of work or part thereof, with the magnitude of the aperture cross-section being adapted to be chosen as desired. The same effect could be obtained also by rotating the movable tube relative to the stationary tube, with the angle of rotation being caused to be proportional to the stroke of the tool or machine element e.g. by a hydraulically operated rack and gear arrangement.

Figure 8:
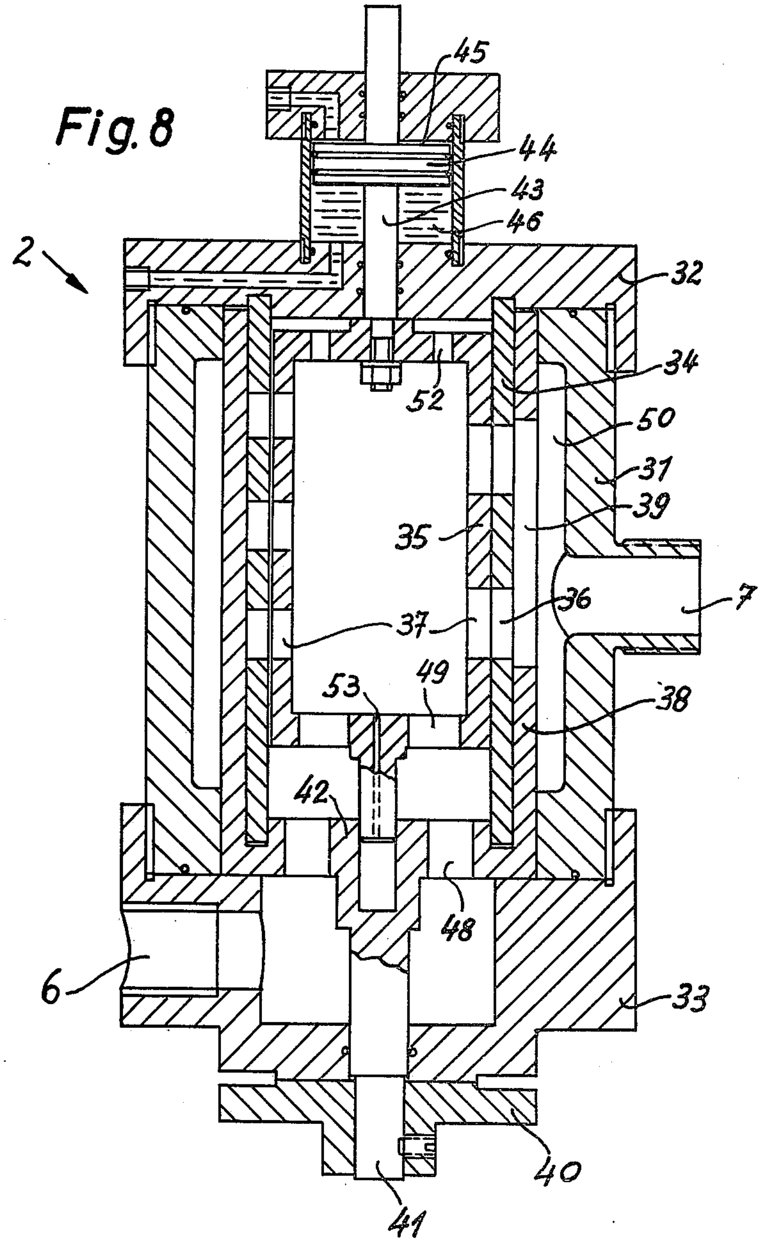
FIG. 8 is an enlarged longitudinal sectional view of a throttling arrangement.

A specific embodiment is shown in FIG. 8 being a longitudinal crposs-sectional view of the throttling arrangement. This arrangement comprises a casing 31 closed by end covers 32 and 33 and receiving a sleeve-shaped, stationary throttling plate 34 in which a sleeve-shaped or tubular throttling plate 35 is axially movable without making contact with plate 34, by maintaining an air gap of about 0.05 mm, depending on the viscosity of the control oil. Both the stationary throttling plate 34 and the movable throttling plate 35 are provide with throttling orifice or apertures 36 and 37, respectively, with the arrangement, configuration and size of such orifices being shown as examples in FIGS. 9 and 10 showing developed projections of the cylindrical walls of said sleeve-shaped throttling plates. FIG. 9 illustrates the orifice pattern of the movable throttling plate 35, and FIG. 10 shows that of the stationary throttling plate 34.

A tubular program plate 38 rotatably mounted around the outer surface of the stationary throttling plate 34 includes a single cutout 39 as shown in FIG. 10, which cutout, depending on its position, exposes a single program of a plurality of programs (six different programs in the embodiment shown). To this end, the program plate 38 is rotatable by means of a handwheel 40 connected through a shaft 41 to the bottom 42 of the respective throttling plate. As shown e.g. in FIG. 1, the casing is provided with an adjustment scale, and the handwheel carrier a pointer.

For sliding moevement, the throttling plate 35 may be directly connected to the movable tool or machine element through a coupling rod 43, or such coupling rod 43 may be connected as a piston rod to a hydraulic piston 44, and the cylinder chambers 45 and 46 of such piston are connected to a power cylinder 4 according to FIG. 1, either directly through pipelines or indirectly through liquid volume and pressure transducer 3. The control oil or working oil to be controlled is fed through input 6 so as to flow through openings 48 and 49 into the interior space of the throttling plate 35. Thereupon, the oil flows through the pairs of orifices or apertures 36, 37 opened in accordance with the respective program whereby the aspired throttling effect is produced, whereupon the oil is discharged from the throttling arrangement through an annular passage 50 and the outlet 7. Similarly, the control oil stream may flow in the opposite direction. Bores 52 and 53 are provided for pessure relief or balance.

Figure 11:
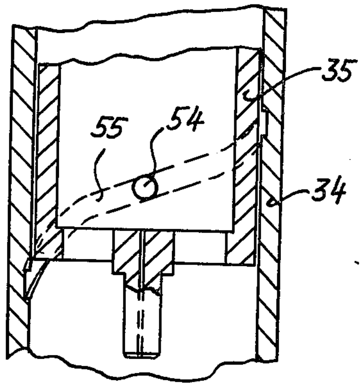
FIG. 11 shows a modified moving or driving assembly for the present throttling arrangement.

Instead of the rectilinear sliding movement of throttling plate 35, a helical movement may be produced, if necessary, by providing the movable throttling plate 35, as shown in FIG. 11, with guiding pins 54, and the stationary throttling plate 34 with helical or spiral guiding grooves 55. The helical relative movement of the throttling apertures 36 and 37 allows control of both the distance or path of control and the speed of control as a function of the path of work or stroke. Alternatively, the guiding pin 54 may be inserted into the stationary throttling plate 34 (with the guiding groove accordingly being provided in the movable throttling plate 35), such that the guiding pin 54 may additionally be formed so as to be axially movable through a not illustrated elongated slot.

What we claim is:

1. A control device for the speed control of pneumatic and/or hydraulic power pistons and machine elements driven by such power pistons, wherein the control of the power piston speed is effected across at least part of the path of movement of said machine element by the pressure head existing in a liquid flowing in parallel with the movement of operation or sroke of said machine element, said pressure head being produced by throttling means defining throttling orifices or apertures adapted to be set to a constant size or adapted to be varied in accordance with the position of said power piston, characterized in that the first liquid flow is utilized as a signal carrier or transmitter for varying the degree of opening of said throttle orifices (36 or 37), wherein a liquid volume and pressure tranducer (3) having an incrementally variable transmission ratio is interposed between said throttling means (2) and said signal transmitter, and that said throttling means which is equipped with a plurality of differently shaped orifice cross-sections adapted to be selectively placed into action, controls the pressure head of a second oil circuit, said pressure head being adapted to be converted into mechanical power through a piston securely connected to the power piston rod or through the power piston per se.

2. The control device according to claim 1. wherein said transducer has an input and driving side arc (3) which includes at one side and interiorly of an oil-charged hydraulic chamber (12), a hydraulically actuated piston (11) including a piston rod (13) extending out from said hydraulic chamber (13), which piston rod through a movable transverse plate (19) is adapted to be selectively connected with frictional engagement to, and detach from one or more piston rods (15) the lower ends (**15*b*) of which are immersed as plunger pistons into hydraulic liquid-filled chambers (16) of the operated hydraulic circuit (10) in such a manner that by tightening and loosening set screws (20 and 21), the upper ends (15*a*) of said other piston rods (15) are either secured to said movable transverse plate (19) or to the stationary frame portion (17*a***) or released from these components, respectively.

3. The control device according to claim 2, characterized in that said other piston rods (15) have secured thereto within said chamber (16) movable double-acting pistons (18) having two piston faces of identical size each.

4. The control device according to claim 2, characterized in that said liquid volume and pressure transducer (3) includes within said driving or operating hydraulic circuit (9) a pair of pistons (11', 11') each postioned in an oil-charged hydraulic chamber (12') and each having a piston rod (13') extending out from said hydraulic chamber, which piston rods are mounted to s transmission means (19') in axially opposing fashion, and that a plurality of hydraulic piston-cylinder units (16',18') are arranged preferably symmetrically around the axial longitudinal axis of said piston rods, said units being interposed into the driven hydraulic circuit (10) in parallel with each other and each unit having a piston surface area different from that of said pistons (11') in said driving hydraulic circuit (9) and each operating in double-acting fashion within their respective cylinders (16), with both sides of said pistons (18') each being interconnected by a by-pass line (23) having disposed therein a valve (22) for selectively cancelling the effect of the individual piston-cylinder units within the driven hydraulic circuit (9).

5. The control device according to claim 1, characterized in that said throttling means (2) has a plurality of apertures (37) of different cross-sectional shapes provided in a first plate (35), which apertures are adapted to be moved in a first direction relative to apertures (36) of a corresponding cross-section in a second, stationary plate (34), while an opening (39) in a third plate (38) by displacement thereof in a second direction exposes one group each only of said plurality of associated pairs of throttling apertures (37, 36).

6. The control device according to claim 5, characterized in that said plates are of sleeve-shaped configuration with said plates defining a common axis in their assembled state.

7. The control device according to claim 5, characterized in that said first direction of displacement extends in parallel to the axis of said sleeve, and that said second direction of displacement comprises a rotary motion about the axis of said sleeve.

8. The control device according to claim 5, characterized in that said sleeve (35) is adapted to be helically or spirally displaced relative to said stationary sleeve (34).

9. The control device according to claim 7, characterized in that the power for adjusting said movable plate or sleeve (35) is produced by a hydraulic or pneumatic piston driving means.

10. A control device for controlling the speed of power pistons and machine elements driven by said pistons comprising:

a signal transmitter adapted to be coupled to said elements for producing a signal indicating a desired movement;

a pressure transducer connected to said transmitter for producing an output having an incrementally variable transmission ratio; and throttling means connected to said transducer having a plurality of differently shaped orifice cross-sections having a flow area controlled by said transducer output so that the pressure head at said orifice is controlled by said signal.

* * * * *

UNITED STATES PATENT AND TRADEMARK OFFICE

CERTIFICATE OF CORRECTION

PATENT NO. : 4,144,904

DATED : March 20, 1979

INVENTOR(S) : Dits

It is certified that error appears in the above-identified patent and that said Letters Patent are hereby corrected as shown below:

Priority should read:

-- June 3, 1976 Fed. Rep. of Germany 2625063 -- .

Column 1, line 37, after "This" read --fact--.

Column 5, line 3, delete "my" and read --may--.

Claim 1, line 7, correct the spelling of "stroke";

line 14, correct "throttle" to --throttling--;

Claim 2, line 9, correct "detach" to --detached--.

Claim 4, line 7, correct "s" to --a--;

line 10, correct "16'" to --16--.

Signed and Sealed this

*Eighth* Day of *July 1980*

[SEAL]

*Attest:*

SIDNEY A. DIAMOND

*Attesting Officer* *Commissioner of Patents and Trademarks*